United States Patent
Machida

(10) Patent No.: US 9,135,078 B2
(45) Date of Patent: Sep. 15, 2015

(54) CONFIGURATION INFORMATION MANAGEMENT SERVER, CONFIGURATION INFORMATION MANAGEMENT METHOD AND CONFIGURATION MANAGEMENT PROGRAM

(75) Inventor: Fumio Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 438 days.

(21) Appl. No.: 13/582,687

(22) PCT Filed: Mar. 1, 2011

(86) PCT No.: PCT/JP2011/054660
§ 371 (c)(1),
(2), (4) Date: Oct. 25, 2012

(87) PCT Pub. No.: WO2011/108553
PCT Pub. Date: Sep. 9, 2011

(65) Prior Publication Data
US 2013/0042000 A1    Feb. 14, 2013

(30) Foreign Application Priority Data

Mar. 3, 2010    (JP) .................................. 2010-046901

(51) Int. Cl.
G06F 15/177    (2006.01)
G06F 9/50    (2006.01)
G06F 11/34    (2006.01)

(52) U.S. Cl.
CPC .......... *G06F 9/5083* (2013.01); *G06F 11/3433* (2013.01); *G06F 2201/815* (2013.01)

(58) Field of Classification Search
CPC ................. G06F 9/45533–2009/45595; H04L 41/085–41/0853
USPC .................................................... 709/223–226
See application file for complete search history.

(56) References Cited

PUBLICATIONS

International Preliminary Report on Patentability issued on Oct. 2, 2012 in PCT/JP2011/054660.
WMware vCenter Server, (http://www.vmware.com/files/jp/pdf/vsp_40_intro_vs_ja.pdf), dated 2009.
WMware vCenter Server, (http://www.vmware.com/files/jp/pdf/vsp_40_intro_vs_ja.pdf), pp. 20-23, dated 2009.
WMware vCenter Server, (http://www.vmware.com/files/jp/pdf/vsp_40_intro_vs_ja.pdf), pp. 20-25, dated 2009.

*Primary Examiner* — Brendan Higa
(74) *Attorney, Agent, or Firm* — Sughrue Mion, PLLC

(57) ABSTRACT

A configuration information management server that can correlate information collected from a virtual server to information collected from a physical server is provided. More specifically, when test load corresponding to a characteristic load pattern is generated in a server whose dependency relationship is to be analyzed, the configuration information management server refers to load information collected from all servers of a system, identifies a server in which the characteristic load pattern is measured, and thereby identifies a physical server and a virtual server having a dependency relationship, obtains correspondence of the physical server information and the virtual server information, and stores it in a configuration information management database.

15 Claims, 12 Drawing Sheets

CONFIGURATION INFORMATION MANAGEMENT SERVER, CONFIGURATION INFORMATION MANAGEMENT METHOD AND CONFIGURATION MANAGEMENT PROGRAM

CROSS REFERENCE TO RELATED APPLICATIONS

This application is a National Stage of International Application No. PCT/JP2011/054660 filed Mar. 1, 2011, claiming priority based on Japanese Patent Application No. 2010-046901 filed Mar. 3, 2010, the contents of all of which are incorporated herein by reference in their entirety.

TECHNICAL FIELD

The present invention relates to a configuration information management server, particularly to a configuration information management server in a network having a mix of a physical server and a virtual server running on the physical server.

BACKGROUND ART

In operation and management of an IT system, it is important to understand configuration information of components of the system such as a server, software, a device and a network. The configuration information of the system is collected and stored in a configuration information database, which enables utilization of it for identifying cause for failure, analyzing performance bottleneck, managing availability and so forth. Not only information of the components of the system but also information of dependency relationship between the components needs to be stored in the configuration information database.

In recent years, an increasing number of systems have a virtual server as a component, and it is necessary to manage the configuration information of the system including the virtual server. Such a virtual server is generated and executed by a server virtualization function and runs on a physical server on which the server virtualization function is installed. A system user and application software (hereinafter referred to as an application) running on a server can utilize the virtual server without regard to a difference between the virtual server and the physical server. However, since a virtual server exists on a certain physical server, there is a dependency relationship between the virtual server and the physical server. Therefore, such a system needs to be provided with a function of identifying the dependency relationship between the virtual server and the physical server.

However, it is impossible from a viewpoint of nature of the virtual server to externally and directly identify the dependency relationship between the virtual server and the physical server. Since the virtual server is configured to behave in the same manner as the physical server, an operating system (hereinafter referred to as an OS) and an application running on the virtual server cannot recognize that they are running on the virtual server. Therefore, the relevant physical server cannot be identified based on information collected from the OS and the application running on the virtual server.

Meanwhile, information indicating that the virtual server is running on the server virtualization function can be obtained from information of the server virtualization function of the physical server. However, it is usually impossible to identify which virtual server is the virtual server running on the server virtualization function. The reason is that information of the virtual server that can be obtained through the server virtualization function is for discriminating virtual servers in the server virtualization function and thus the configuration information of the OS and the application running on the virtual server cannot be referred to. Although such a method that logs-in the virtual server to collect information may be considered, it requires a user account of the OS running on the virtual server. Since a log-in means varies depending on the OS running on the virtual server, automation is difficult. Moreover, automation of the log-in processing is not desirable from a viewpoint of security management. It is therefore hard to identify the OS and the application running on the virtual server based on information collected from the physical server.

In operation and management of a system having a plurality of physical servers and a virtual server, a technique such as a server virtualization integrated management function as described in Non-Patent Literature 1 is generally used in order to achieve integrated management of the server virtualization function. According to the server virtualization integrated management function described in Non-Patent Literature 1, operations executed on the server virtualization function such as start and stop of a virtual server and migration (operation of migrating and converting programs and data) all are recorded and thereby it is possible to recognize which virtual server is currently running on which physical server.

However, according to the conventional method such as the server virtualization integrated management function described in Non-Patent Literature 1, all operations with respect to a virtual machine must be performed through the server virtualization integrated management function. In a case where an operation of the virtual machine is executed without using the server virtualization integrated management function and in a case where a virtual server is added due to integration with another system, it is necessary to newly set up the server virtualization function. Such the job is complicated in a case where the executed operation is complicated and in a case where a large number of physical servers and virtual servers are added/deleted. Moreover, since the server virtualization integrated management function can only collect the configuration information of a specific server virtualization function, it is not possible to manage information of a virtual server generated by another server virtualization function.

As a related technique, Japanese Patent Publication JP-2008-242766 (Patent Literature 1) discloses a process control system. According to this related technique, a virtual server providing services is constituted by a plurality of physical servers in the process control system. At least one physical server receives, from a console terminal, node list information indicating a correspondence relationship between a virtual server and a physical server constituting it and service list information indicating a correspondence relationship between a virtual server and a service provided by it, to generate an allocation table that defines allocation of a service to a physical server. Then, the allocation table is recorded on a shared database of a database server that is referable from all the physical servers. A physical server refers to the allocation table when activating a service process.

Japanese Patent Publication JP-2008-059599 (Patent Literature 2) discloses a method of allocating virtualized resource and an execution system thereof. According to this related technique, in a method for arranging a program in a resource that is suitable for the operation condition of the program, management information indicating a state about performance and capacity of each resource is collected and managed, configuration management information of each resource is maintained and managed by referring to the management information, the configuration management information including identification information of a resource used by each business application is referred to, the configuration management information of the resource identified by the identification information is read out from the configuration management information of each resource, and thereby business application information indicating a correspondence relationship between the configuration management information of the business application and the configuration management information of the searched resource is generated. If the configuration management information of the resource matches a rule for detecting resource failure of the corresponding business application, information indicating occurrence of the resource failure in the business application is output.

Japanese Patent Publication JP-2007-272263 (Patent Literature 3) discloses a method of managing a computer, a computer system and a management program. According to this related technique, a method of managing a computer in a computer system equipped with a plurality of physical computers; a plurality of virtual computers running on the physical computers; a management computer connected through a network to the physical computers, is characterized by including: receiving designation of processing performance allocated with respect to each group; collecting processing performance of the physical computers; and allocating the designated processing performance of the group to the virtual computers belonging to the group on the basis of the collected processing performance of the physical computers.

Japanese Patent Publication JP-2006-519423 (Patent Literature 4) discloses dynamic service registry for a virtual machine. This related technique is as follows. A traditional registry, such as a global UDDI (Universal Description, Discovery, and Integration) server, is not designed to accommodate transitory devices, e.g., devices that may frequently attach and detach from a network, often-times without warning, such as virtual machines offering or desiring services that are periodically instantiated and then suspended or destroyed. To accommodate such transitory devices, a dynamic resource/service registry may be implemented that leverages lower-level protocols or state to determine appropriate registry updates to keep the registry state consistent with currently-active virtual machines. For example, a virtual machine monitor (VMM) may track creation and suspension or deletion of a virtual machine (VM), and resources advertised by the VM, where the VMM appropriately adds or removes registry entries for the VM as the state of the VM changes or provides hooks (e.g. notifications) or other instrumentation based on said state or protocols to enable other associated modules or agents (e.g. management modules or the registry) to take appropriate actions.

CITATION LIST

Patent Literature

[Patent Literature 1] Japanese Patent Publication JP-2008-242766
[Patent Literature 2] Japanese Patent Publication JP-2008-059599
[Patent Literature 3] Japanese Patent Publication JP-2007-272263
[Patent Literature 4] Japanese Patent Publication JP-2006-519423

Non Patent Literature

[Non-Patent Literature 1] VMware vCenter Server, Summary of VMware vSphere, (http://www.vmware.com/files/jp/pdf/vsp_40_intro_vs_ja.pdf), p20-p23

SUMMARY OF INVENTION

According to the above-described techniques, if a location of a virtual server is once lost and if no management log of the virtual server exists or if a management log thereof is not correct, it is not possible to correlate the virtual server to a physical server on which the virtual server is running.

A configuration information management server according to the present invention has: a server information collecting function unit configured to measure load of each of a plurality of servers; and a configuration information correlating function unit. The plurality of servers includes: a first server; and a second server other than the first server. When load with a predetermined pattern is imposed on the first server and load with a pattern corresponding to the predetermined pattern is measured from the second server, the configuration information correlating function unit stores, in a storage device, information indicating that the second server is a physical server and the first server is a virtual server running on the second server and information indicating a correspondence relationship between the physical server and the virtual server.

A configuration information management method according to the present invention is executed by a configuration information management server. The configuration information management method includes: measuring load of each of a plurality of servers, wherein the plurality of servers has: a first server; and a second server other than the first server; and storing in a storage device, when load with a predetermined pattern is imposed on the first server and load with a pattern corresponding to the predetermined pattern is measured from the second server, information indicating that the second server is a physical server and the first server is a virtual server running on the second server and information indicating a correspondence relationship between the physical server and the virtual server.

A configuration information management program according to the present invention is a program that causes a computer to execute processing of the above-mentioned configuration information management method. It should be noted that the configuration information management program according to the present invention may be stored in a storage device or a recording medium.

As a result, even if no management log of a virtual server exists or if a management log thereof is not correct, it is possible to correlate the virtual server to a physical server on which the virtual server is running.

DESCRIPTION OF EMBODIMENTS

First Exemplary Embodiment

A first exemplary embodiment of the present invention will be described below with reference to the attached drawings.

[Basic Configuration]

Figure 1:
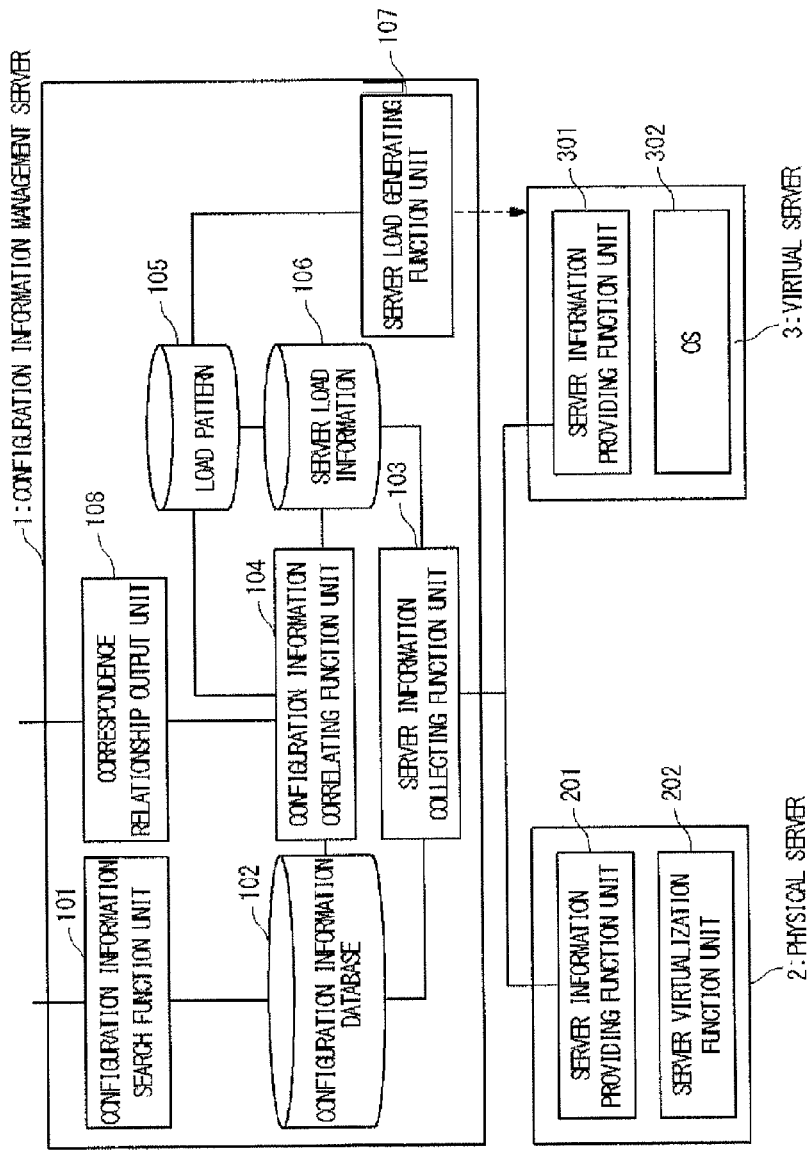
FIG. 1 is a block diagram showing a configuration of a first exemplary embodiment of the present invention.

Referring to FIG. 1, a configuration information management system according to a first exemplary embodiment of the present invention has a configuration information management server 1, a physical server 2 and a virtual server 3.

The configuration information management server 1 correlates and manages the physical server 2 and the virtual server 3 in a network system. There is one or more physical servers 2 in the network system. The virtual server 3 operates (runs) on the physical server 2. When transmitting and receiving information, the configuration information management server 1, the physical server 2 and the virtual server 3 may communicate with each other by using IP address (Internet Protocol Address).

[Configuration of Configuration Information Management Server]

The configuration information management server 1 has a configuration information search function unit 101, a configuration information database 102, a server information collecting function unit 103, a configuration information correlating function unit 104, a load pattern 105, server load information 106, a server load generating function unit 107 and a correspondence relationship output unit 108.

The configuration information search function unit 101 receives a search request for configuration information and a correspondence relationship from a user, an application and the like, queries the configuration information database 102 and issues instructions to the configuration information correlating function unit 104.

The configuration information database 102 stores configuration information of a target system that is collected by the server information collecting function unit 103.

The server information collecting function unit 103 communicates with server information providing functions (a server information providing function unit 201 and a server information providing function unit 301 which will be described later) of the physical server 2 and the virtual server 3 through a network, receives and observes the configuration information and load information of the servers, and stores it in the configuration information database 102 and the server load information 106.

The configuration information correlating function unit 104 compares observed server load information 106 with the load pattern 105 and correlates the virtual server 3 to the physical server 2.

The load pattern 105 defines a characteristic load pattern at a time when test load is imposed (provided) on the virtual server 3. The characteristic load pattern is a load pattern whose characteristics are distinct, and imposing the characteristic load pattern on a virtual server has an obvious effect on a physical server on which the virtual server is running. Since all communication to the virtual server is performed through a network interface of the physical server, communication load with respect to the virtual server is also detected as communication load with respect to the physical server. The same applies to load other than the communication load.

The server load information 106 stores load variation information of a server that is received and observed by the server information collecting function unit 103.

The server load generating function unit 107 performs network access to the virtual server 3 based on the defined load pattern 105 to generate the test load in the server.

The correspondence relationship output unit 108 outputs information indicating a correspondence relationship between the virtual server 3 and the physical server 2. The output destination is not limited to the search request source but can be an output device such as a display and a printer, another server or a communication terminal. At this time, the correspondence relationship output unit 108 may output information indicating the configuration information of each server together with the information indicating the correspondence relationship. The correspondence relationship output unit 108 may be integrated with the configuration information search function unit 101.

[Configuration of Physical Server]

The physical server 2 has a server information providing function unit 201 and a server virtualization function unit 202.

The server information providing function unit 201 collects the configuration information and the load information of the physical server 2 and transmits them to the configuration information management server 1. The server virtualization function unit 202 virtualizes computer resources of the physical server 2 and manages creation, execution and deletion of the virtual server 3.

[Configuration of Virtual Server]

The virtual server 3 has a server information providing function unit 301 and an operating system (OS) 302.

The server information providing function unit 301 collects the configuration information of the virtual server 3 and transmits it to the configuration information management server 1. The OS 302 manages execution of an application on the virtual server 3.

[Examples of Hardware]

The configuration information management server 1 and the physical server 2 are exemplified by a computer such as a PC (personal computer), a work station, a main frame and a super computer. Note that the configuration information management server 1 may be one of the physical servers 2. Alternatively, the configuration information management server 1 may be a virtual server running on a computer. For example, the configuration information management server 1 may be one of the virtual servers 3.

Each function unit such as the configuration information search function unit 101, the server information collecting function unit 103, the configuration information correlating function unit 104, the server load generating function unit 107, the correspondence relationship output unit 108, the server information providing function unit 201, the server virtualization function unit 202, the virtual server 3, the server information providing function unit 301 and the operating system (OS) 302 is achieved by a processor driven by a program to execute predetermined processing and a memory for storing the program and various types of data.

The above-mentioned processor is exemplified by a CPU (Central Processing Unit), a microprocessor, a micro controller or a semiconductor integrated circuit (IC) having similar functions.

The above-mentioned memory is exemplified by a semiconductor memory device such as a RAM (Random Access Memory), a ROM (Read Only Memory), an EEPROM (Electrically Erasable and Programmable Read Only Memory) and a flash memory.

Moreover, when each function unit needs to perform communication through a network, each function unit uses a network interface installed in each of the configuration information management server 1 and the physical server 2. The network interface is exemplified by a semiconductor integrated circuit such as a board (mother board, I/O board) and a chip supporting network communication, a network adapter such as a NIC (Network Interface Card), a communication device such as an antenna, and a communication port such as a connecting port (connector). The network is exemplified by the Internet, a LAN (Local Area Network), a wireless LAN (Wireless LAN), WAN (Wide Area Network), backbone (Backbone), a cable television (CATV) line, a fixed-line telephone network, a mobile telephone network, WiMAX (IEEE 802.16a), 3G (3rd Generation), a lease line, IrDA (Infrared Data Association), Bluetooth (registered trademark), a serial communication line and a data bus.

A hardware for storing the configuration information database 102, the load pattern 105 and the server load information 106 is exemplified by an auxiliary storage device such as an HDD (Hard Disk Drive) and an SSD (Solid State Drive) and a recording medium such as a DVD (Digital Versatile Disk) and a memory card. The configuration information database 102 is not limited to a storage device built in the computer but can be a peripheral device (e.g. external HDD), a storage device of an external server (e.g. storage server), a DAS (Direct Attached Storage), an FC-SAN (Fibre Channel-Storage Area Network), an NAS (Network Attached Storage), or an IP-SAN (IP-Storage Area Network).

In practice, however, it is not limited to these examples.

[Examples of Configuration Information]

Here, the configuration information is exemplified by information about a CPU, a memory, an HDD, a NIC and the like of the physical server and information about a CPU, a memory, an HDD, a NIC and the like allocated to the virtual server. The configuration information of the physical server and the virtual server may include, for example, names and addresses (host names, IP addresses and the like) of the physical server and the virtual server used in the network system.

[Examples of Load Information]

A type of load imposed on the server is exemplified by network load (NW load), processing load (CPU load), disk write load (disk load) and the like. For example, large-volume data are transmitted to a server for a predetermined period at a characteristic interval or a regular interval, while status of use of each resource of the server is monitored. If distinct and characteristic variation appears in the status of use of each resource, the variation is handled as the load. The variation in the status of use of each resource is not limited to variation in usage amount of each resource at the time but can be variation in remaining amount of each resource. Here, let us consider the network load (NW load) as an example of the load imposed on the server.

In practice, however, it is not limited to these examples.

[Overall Operation]

Next, an overall operation of the present exemplary embodiment will be described in detail with reference to FIG. 1 and flow charts shown in FIGS. 2 to 5.

[Operation of Collecting Configuration Information and Load Information of Server]

An operation of collecting the configuration information and the load information of the server in the physical server 2 and the virtual server 3 will be described with reference to the flow chart shown in FIG. 2.

(1) Step S101

The server information providing function unit 201 and the server information providing function unit 301 each receives a collection request for the configuration information and the load information of the server, from the configuration information management server 1 through the network.

(2) Step S102

The server information providing function unit 201 and the server information providing function unit 301 each collects information about the software and the devices constituting the server and information about load status of the CPU and the network, through the server virtualization function and the OS.

(3) Step S103

The server information providing function unit 201 and the server information providing function unit 301 each transmits the collected information to the configuration information management server 1 through the network.

It should be noted that the server information providing function unit 201 and the server information providing function unit 301 each may automatically transmit the collected information to the configuration information management server 1, once it receives the collection request from the configuration information management server 1 (Push type). Alternatively, the server information providing function unit 201 and the server information providing function unit 301 each may transmit the collected information to the configuration information management server 1 every time it receives the collection request from the configuration information management server 1 (Pull type).

[Operation of Server Information Collection Processing]

Next, an operation of server information collection processing in the configuration information management server 1 will be described with reference to the flow chart shown in FIG. 3.

(1) Step S201

The server information collecting function unit 103 transmits the collection request for server information through the network to a server (physical server 2, virtual server 3) being a management target. It should be noted that the server information includes the configuration information and the load information of each server.

(2) Step S202

The server information collecting function unit 103 receives the server information as a response to the collection request, from the server (physical server 2, virtual server 3) being the management target through the network.

(3) Step S203

The server information collecting function unit 103 stores the configuration information of each server among the received server information in the configuration information database 102.

(4) Step S204

The server information collecting function unit 103 stores the load information of each server among the received information in the server load information 106. At this time, if the load information of each server is already stored in the server load information 106, the server information collecting function unit 103 updates the server load information 106.

[Operation of Configuration Information Search Processing]

Figure 4:
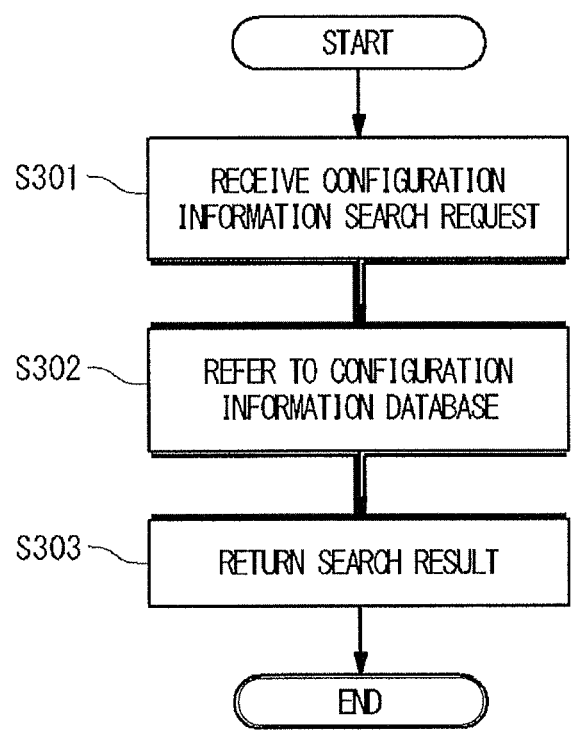
FIG. 4 is a flow chart showing an operation of searching for configuration information by a configuration information management server according to the first exemplary embodiment.

The flow chart in FIG. 4 shows an operation of the configuration information search processing.

(1) Step S301

The configuration information search function unit 101 receives, directly or through the network, input of a search request for the configuration information from a user or an application. For example, the configuration information search function unit 101 receives input of a search request for the configuration information of a specific server or a plurality of servers, based on a user action to a consol attached to the configuration information management server 1 or an operation of the application on the configuration information management server 1. Alternatively, the configuration information search function unit 101 receives input of a search request for the configuration information of a specific server or a plurality of servers, through the network from a terminal connected to the configuration information management server 1.

(2) Step S302

In response to the input of the search request, the configuration information search function unit 101 refers to the configuration information database 102 to search for the requested configuration information.

(3) Step S303

The configuration information search function unit 101 obtains the requested configuration information from the configuration information database 102 and returns the result (the requested configuration information) to the search request source. At this time, the configuration information search function unit 101 may instruct the correspondence relationship output unit 108 to output the configuration information obtained from the configuration information database 102 to a predetermined output destination.

In the above-described operation, a search request for the configuration information of a certain server is received and the configuration information of the server is returned. In a case where the server is a virtual server or in a case where the server is a physical server and a virtual server is running on the physical server, information indicating a correspondence relationship between the virtual server and a physical server may be output (the correspondence relationship may be shown). As a method for outputting the information indicating the correspondence relationship, information clearly indicating the virtual server and the physical server or a correspondence table between the virtual server and the physical server may be returned to the search request source. It should be noted that in a case where the server is a virtual server, a signal or a command for causing some actions (for example, LED flicker, sound generation and the like) may be transmitted to a physical server correlated to the virtual server. In practice, however, it is not limited to these examples.

In this case, in response to the input of the search request, the configuration information search function unit 101 not only refers to the configuration information database 102 but also transmits an activation instruction to the configuration information correlating function unit 104. In response to the activation instruction, the configuration information correlating function unit 104 performs an operation of correlating the virtual server to the physical server.

[Operation of Correlating Virtual Server to Physical Server]

Next, an operation of correlating the virtual server 3 to the physical server 2 will be described with reference to the flow chart shown in FIG. 5.

(1) Step S401

First, the configuration information correlating function unit 104 selects one server whose dependency relationship to the physical server 2 is not yet identified (i.e. a server whose dependency relationship is unclear). This means that the dependency relationship of the server is solved one-by-one. The configuration information correlating function unit 104 may select the server in accordance with an instruction or a command from the configuration information search function unit 101. In this case, the configuration information search function unit 101 receives input of information indicating the server from a user or an application, directly or through the network.

(2) Step S402

The configuration information correlating function unit 104 refers to the load pattern 105. In a case where there are a plurality of load patterns as candidates of the load pattern 105, one of the plurality of load patterns may be selected as the load pattern 105.

(3) Step S403

The server load generating function unit 107 receives information indicating the selected server and the load pattern 105 from the configuration information correlating function unit 104 and imposes, based on the load pattern 150, test load corresponding to a characteristic load pattern on the selected server. It should be noted that, at the same time as the imposing of the test load corresponding to the characteristic load pattern, the configuration information correlating function unit 104 or the server load generating function unit 107 may transmit an instruction or a command of initiation to the server information collecting function unit 103.

(4) Step S404

The server information collecting function unit 103 receives and observes the load information of all the physical servers 2 and stores it in the server load information 106, periodically or when receiving the instruction or the command from the configuration information correlating function unit 104 or the server load generating function unit 107. If the selected server is the virtual server 3, the test load imposed on the virtual server 3 usually affects the load on the physical server 2 and thus variation in the load can be observed by the physical server 2. On the other hand, if the selected server is the physical server 2, the load information to be compared with the load pattern 105 is not observed by any server other than the selected server.

(5) Step S405

The configuration information correlating function unit 104 reads out the load information stored in the server load information 106 (i.e. the load information of all the physical servers 2) and checks the read-out load information against the generated load pattern 105. In the case where the selected server is the virtual server 3, the generated load pattern 105 is equivalent to the load information of the virtual server 3. This means that the configuration information correlating function unit 104 checks the load information of the virtual server 3 against the load information of all the physical servers 2. It should be noted that, in practice, the configuration information correlating function unit 104 may separately collect the load information of the selected server and check the load information of the selected server against the read-out load information. Moreover, the configuration information correlating function unit 104 initializes the server load information 106 after performing the checking. For example, the configuration information correlating function unit 104 deletes, moves or renames the load information stored in the server load information 106 (i.e. the load information of all the physical servers 2) to eliminate it from the candidates of the checking thereafter.

(6) Step S406

Based on the result of the checking, the configuration information correlating function unit 104 tries to identify a physical server 2 on which the virtual server 3 is estimated to be running. For example, if characteristics corresponding to the generated load pattern 105 appear in the load information of a physical server 2 (i.e. if the load information of a physical server 2 corresponds to the load pattern 105), the configuration information correlating function unit 104 determined that the virtual server 3 is running on the physical server 2.

(7) Step S407

If the physical server 2 is identified (Step S406; Yes), the configuration information correlating function unit 104 correlates the virtual server 3 to the physical server 2 to generate the correspondence information. It should be noted that the correspondence information may be a correspondence table between the physical server 2 and the virtual server 3 or may be information obtained by adding information indicating the correlated physical server 2 to the configuration information of the virtual server 3.

(8) Step S408

The configuration information correlating function unit 104 updates the configuration information database 102 in accordance with the correspondence information. For example, the configuration information correlating function unit 104 records the correspondence information itself on the configuration information database 102. Alternatively, based on the content of the correspondence information, the configuration information correlating function unit 104 may add information indicating the correspondence relationship between the physical server 2 and the virtual server 3 to the configuration information database 102.

(9) Step S409

If the physical server 2 cannot be identified (Step S406; No), the configuration information correlating function unit 104 determines that the selected server is the physical server 2, and is terminated. In this case, the correspondence information indicates that there is no virtual server 3 correlated to the physical server 2. It should be noted that the configuration information correlating function unit 104 may register information indicating that the selected server is a physical server on the configuration information database 102.

After the above-described processing, the configuration information correlating function unit 104 may instruct the correspondence relationship output unit 108 to output the correspondence information to a predetermined output destination. In this case, the correspondence relationship output unit 108 directly receives the correspondence information from the configuration information correlating function unit 104 and outputs it. Alternatively, the correspondence relationship output unit 108 may detect update of the configuration information database 102 or periodically check contents of the configuration information database 102 to automatically read out the correspondence information from the configuration information database 102 and output it to a predetermined output destination.

[Effects of the Present Exemplary Embodiment]

According to the present exemplary embodiment, even if no management log of the virtual server exists or if a management log thereof is not correct, the information of the physical server can be collected from the virtual server while the information of the virtual server can be collected from the physical server. It is therefore possible to recognize the correspondence relationship between the virtual server and the physical server, based on the information collected from the virtual server and the information collected from the physical server.

Moreover, even if the virtual server is not under the control of the server virtualization function, it is possible to recognize the correspondence relationship between the virtual server and the physical server.

Furthermore, it is possible to recognize the correspondence relationship between the virtual server and the physical server, regardless of the OS of the virtual server.

According to the present exemplary embodiment, even if a virtual server is eliminated from monitoring target for a long period of time for any reason and, during that time, migration of the virtual server is executed for many times due to automatic processing for load balancing on the physical server or an operation by another system administrator, it is possible to externally correlate the virtual server and the physical server on which the virtual server is running.

Second Exemplary Embodiment

A second exemplary embodiment of the present invention will be described below in detail.

[Basic Configuration]

Figure 6:
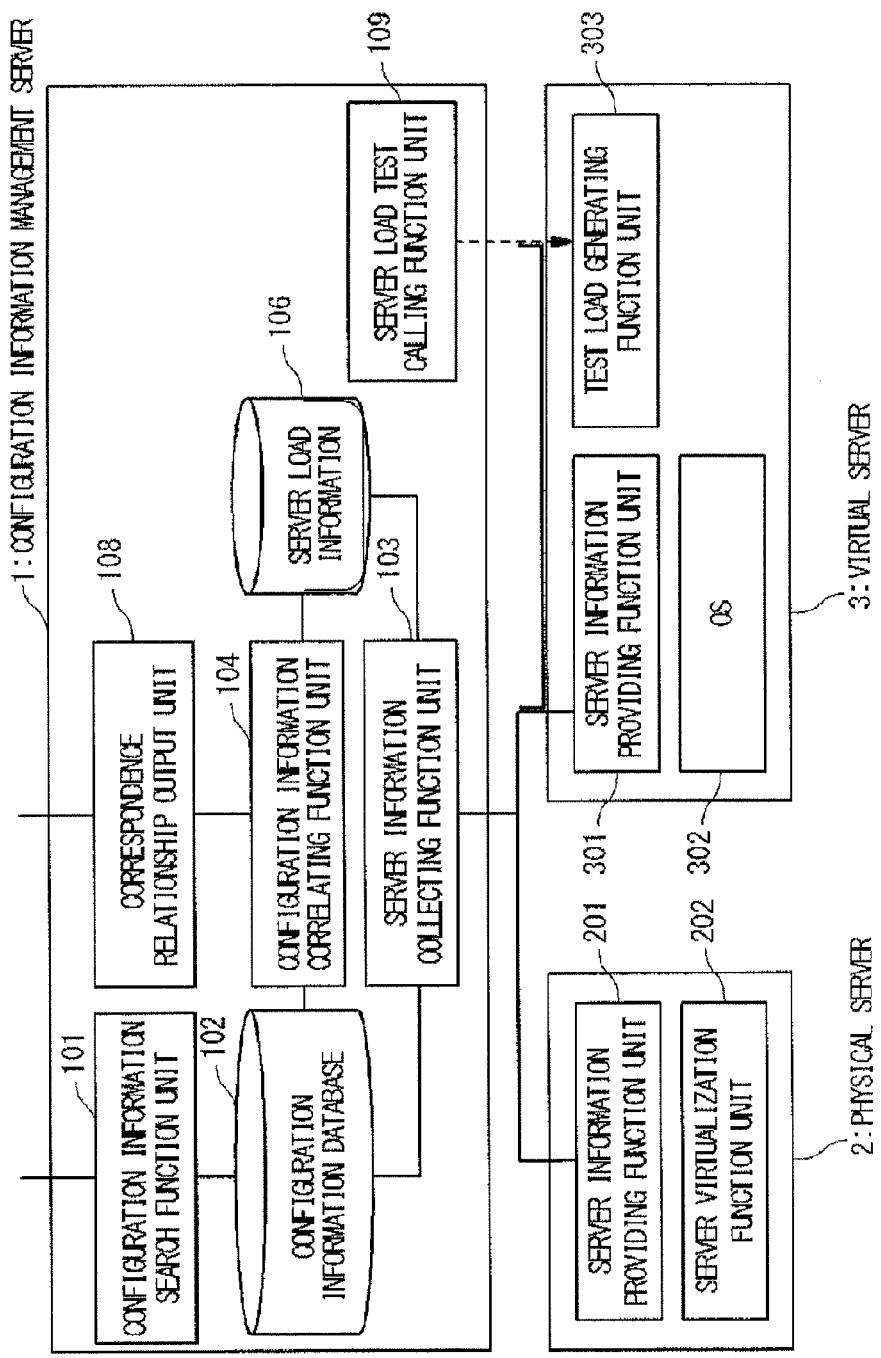
FIG. 6 is a block diagram showing a configuration of a second exemplary embodiment of the present invention.

Referring to FIG. 6, a configuration information management system according to a second exemplary embodiment of the present invention has a configuration information management server 1, a physical server 2 and a virtual server 3.

The configuration information management server 1 correlates and manages the physical server 2 and the virtual server 3 in a network system. There is one or more physical servers 2 in the network system. The virtual server 3 operates (runs) on the physical server 2.

[Configuration of Configuration Information Management Server]

The configuration information management server 1 has a configuration information search function unit 101, a configuration information database 102, a server information collecting function unit 103, a configuration information correlating function unit 104, a server load information 106, a correspondence relationship output unit 108 and a server load test calling function unit 109.

The configuration information search function unit 101, the configuration information database 102, the server information collecting function unit 103, the server load information 106 and the correspondence relationship output unit 108 are the same as those described in the first exemplary embodiment of the present invention.

The configuration information correlating function unit 104 checks the load information of the virtual server 3 against the load information of the physical server 2 to correlate the virtual server 3 to the physical server 2. When identifying a physical server 2 on which the virtual server 3 is running, the server load test calling function unit 109 calls and executes a test load generating function running on the virtual server 3.

[Configuration of Physical Server]

The physical server 2 has a server information providing function unit 201 and a server virtualization function unit 202.

The server information providing function unit 201 and the server virtualization function unit 202 are the same as those described in the first exemplary embodiment of the present invention.

[Configuration of Virtual Server]

The virtual server 3 has a server information providing function unit 301, an operating system (OS) 302 and a test load generating function unit 303.

The server information providing function unit 301 and the operating system (OS) 302 are the same as those described in the first exemplary embodiment of the present invention.

The test load generating function unit 303 is beforehand prepared (built) in the virtual server 3. In response to a request from the server load calling function unit 109, the test load generating function unit 303 executes test processing that generates the test load corresponding to the characteristic load pattern. For example, the test load generating function unit 303 is set in an image file of the virtual server 3 or a template.

[Operation of Second Exemplary Embodiment]

Next, an operation of the present exemplary embodiment will be described with reference to flow charts shown in FIGS. 2 to 4 and 7.

Figure 2:
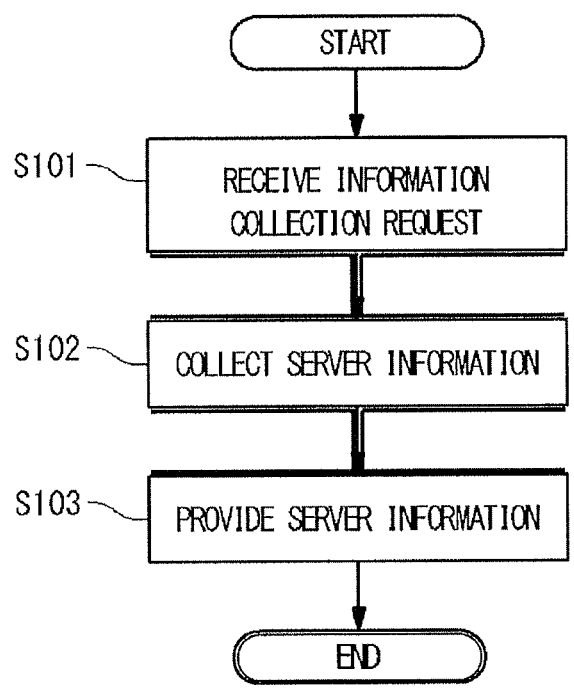
FIG. 2 is a flow chart showing an operation of collecting configuration information and load information of a server according to the first exemplary embodiment.

An operation of collecting the configuration information and the load information of the server follows the flow chart shown in FIG. 2 that is described in the first exemplary embodiment of the present invention.

Figure 3:
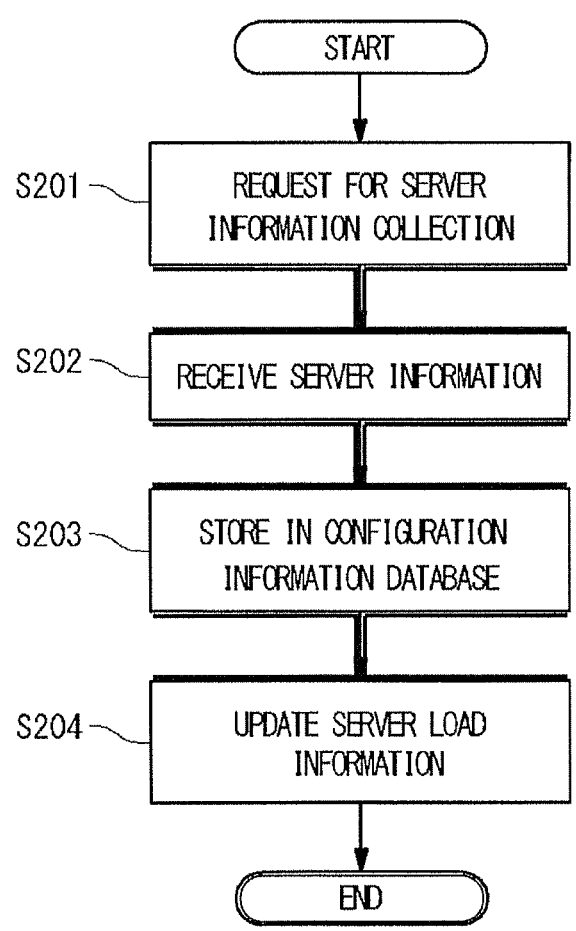
FIG. 3 is a flow chart showing an operation of collecting configuration information and load information by a configuration information management server according to the first exemplary embodiment.

An operation of server information collection processing in the configuration information management server 1 follows the flow chart shown in FIG. 3 that is described in the first exemplary embodiment of the present invention.

An operation of the configuration information search processing in the configuration information management server 1 follows the flow chart shown in FIG. 4 that is described in the first exemplary embodiment of the present invention.

[Operation of Correlating Virtual Server to Physical Server]

Figure 7:
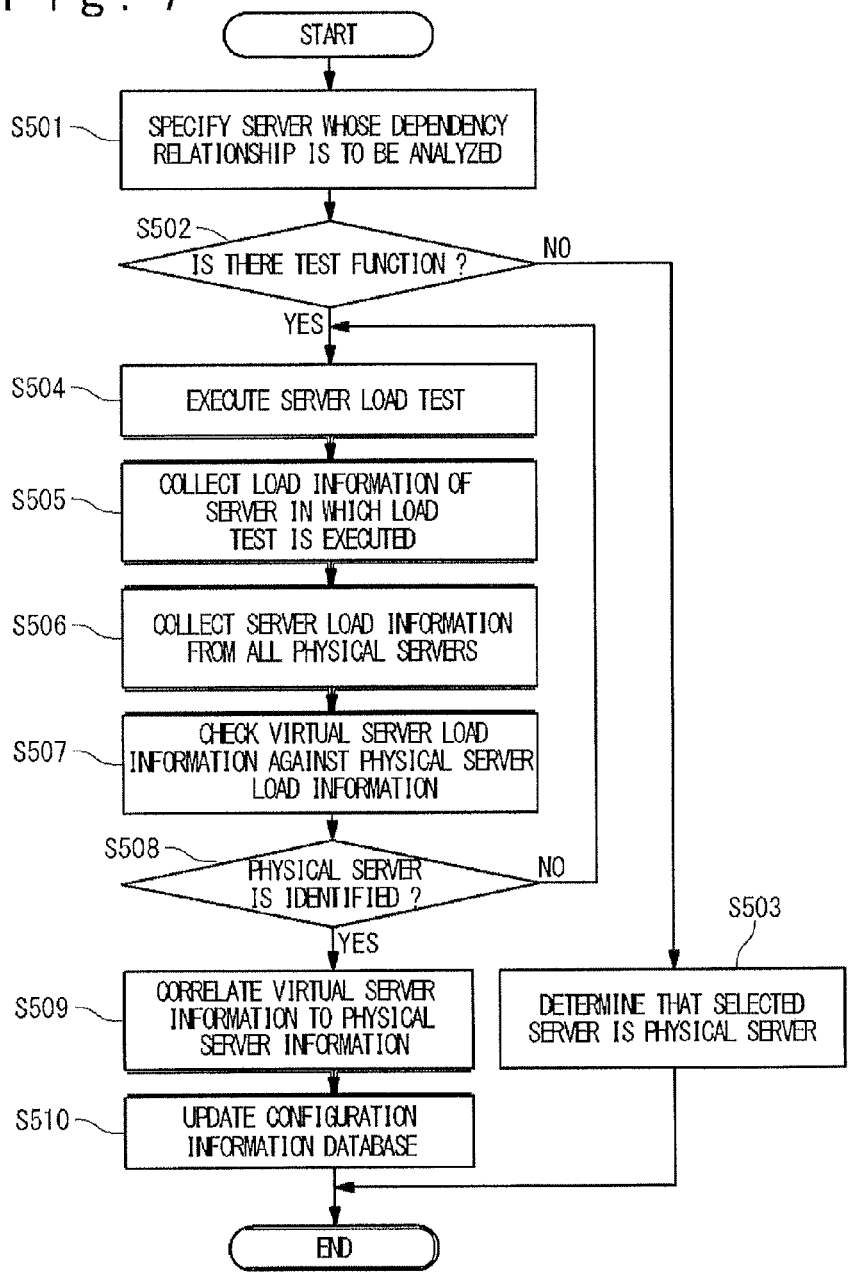
FIG. 7 is a flow chart showing an operation of obtaining, based on load information observed by imposing load on servers, a correspondence relationship between a physical server and a virtual server according to the second exemplary embodiment.

The flow chart of FIG. 7 shows an operation of correlating the virtual server 3 to the physical server 2 stored in the configuration information database 102.

(1) Step S501

First, the configuration information correlating function unit 104 selects one server whose dependency relationship to the physical server 2 is not yet identified (i.e. a server whose dependency relationship is unclear). This operation is the same as that in the first exemplary embodiment (Step S401 in FIG. 5).

(2) Step S502

The configuration information correlating function unit 104 transmits information indicating the selected server to the server load test calling function unit 109. When receiving the information indicating the selected server from the configuration information correlating function unit 104, the server load test calling function unit 109 checks whether or not the selected server is provided with the test load generating function unit 303. For example, the server load test calling function unit 109 transmits an instruction of activating the test load generating function unit 303 to the selected server and checks whether or not response indicating the activation is received.

(3) Step S503

If existence of the test load generating function unit 303 in the selected server is not confirmed (Step S502; No), the server load test calling function unit 109 notifies the configuration information correlating function unit 104 of that. When receiving this notification, the configuration information correlating function unit 104 determines that the selected server is the physical server 2, and is terminated. In this case, the correspondence information indicates that there is no virtual server 3 correlated to the physical server 2. It should be noted that the configuration information correlating function unit 104 may register information indicating that the selected server is a physical server on the configuration information database 102.

(4) Step S504

If existence of the test load generating function unit 303 in the selected server is confirmed (Step S502; Yes), the server load test calling function unit 109 performs the server load test. At this time, the server load test calling function unit 109 accesses the test load generating function unit 303 in accordance with an instruction or a command from the configuration information correlating function unit 104 to generate, on the virtual server 3, test load corresponding to the characteristic load pattern that is not generated during normal operation.

(5) Step S505

Meanwhile, the configuration information correlating function unit 104 activates (boots) the server information collecting function unit 103. The server information collecting function unit 103 collects the load information of the server in which the load test is performed. At this time, the server information collecting function unit 103 collects information regarding variation in load on the virtual server 3, in accordance with an instruction or a command from the configuration information correlating function unit 104.

(6) Step S506

Similarly, the server information collecting function unit 103 collects the load information of all the physical servers 2. At this time, the server information collecting function unit 103 collects information regarding variation in load on the physical server 2, in accordance with an instruction or a command from the configuration information correlating function unit 104.

(7) Step S507

After that, the server information collecting function unit 103 notifies the configuration information correlating function unit 104 of the collected load information of the virtual server 3 and the collected load information of the physical server 2. The configuration information correlating function unit 104 checks the load information of the physical server 2 against the load information of the virtual server 3.

(8) Step S508

The configuration information correlating function unit 104 identifies a physical server 2 on which the virtual server 3 is estimated to be running. For example, the configuration information correlating function unit 104 compares the load information of the virtual server 3 and the load information of the physical server 2 and, if respective load patterns of the load information have something in common, determines that the virtual server 3 is running on the physical server 2. It should be noted that, if the physical server 2 cannot be identified (Step S508; No), the configuration information correlating function unit 104 repeats the same test or, if there is another test function, calls the other test function to repeat the test.

(9) Step S509

If the physical server 2 is identified (Step S508; Yes), the configuration information correlating function unit 104 generates the correspondence information between the physical server 2 and the virtual server 3.

(10) Step S510

The configuration information correlating function unit 104 updates the configuration information database 102 based on the generated correspondence information. The configuration information correlating function unit 104 refers to the updated configuration information database 102 to obtain the generated correspondence information. At this time, the configuration information correlating function unit 104 may notify the configuration information correlating function unit 104 of the generated correspondence information.

After the above-described processing, the configuration information correlating function unit 104 may instruct the correspondence relationship output unit 108 to output the correspondence information to a predetermined output destination. In this case, the correspondence relationship output unit 108 directly receives the correspondence information from the configuration information correlating function unit 104 and outputs it. Alternatively, the correspondence relationship output unit 108 may detect update of the configuration information database 102 or periodically check contents of the configuration information database 102 to automatically read out the correspondence information from the configuration information database 102 and output it to a predetermined output destination.

[Effects of the Present Exemplary Embodiment]

The present exemplary embodiment is configured such that the load variation due to execution of the test program on the virtual server is detected in both of the physical server and the virtual server and then the load variations are compared with each other. It is therefore possible to identify the correspondence relationship between the virtual server and the physical server and manages it in the configuration information database.

Moreover, the present exemplary embodiment is configured without requiring any functionality expansion in the server virtualization function and the OS in the virtual server. Therefore, the physical server on which the virtual server is running can be quickly identified in accordance with a common procedure without regard to the server virtualization function and the OS. Furthermore, the present exemplary embodiment is configured such that the test load generating function is provided within the virtual server. It is therefore possible to prepare a test function generating various types of load and thus to improve accuracy of the checking.

More specifically, in the first exemplary embodiment, the test basically imposes the communication load due to the load pattern through the network. Therefore, if the network is already at a heavily-loaded state at the time of the test execution or if the load pattern is not characteristic, the detection accuracy can be deteriorated.

According to the second exemplary embodiment, on the other hand, the test load generating function is provided within the virtual server. It is thus possible to execute the test with imposing CPU load or disk load as well as the communication load due to the load pattern through the network. For example, in a case where a plurality of physical servers are detected as candidates when the CPU load is imposed, performing the test by subsequently imposing the disk load is considered to result in further precise identification of the candidate. Moreover, such a test that concurrently imposes the CPU load and the disk load also is possible. In this manner, a plurality of alternative tests can be prepared to narrow the candidate of the physical server more precisely, which can improve accuracy of the checking.

Relationship of Respective Exemplary Embodiments

It should be noted that the respective exemplary embodiments described above can be combined with each other.

EXAMPLES

Next, the operations of the exemplary embodiments of the present invention will be described by using concrete examples (a first example, a second example and a third example).

First Example

Figure 8:
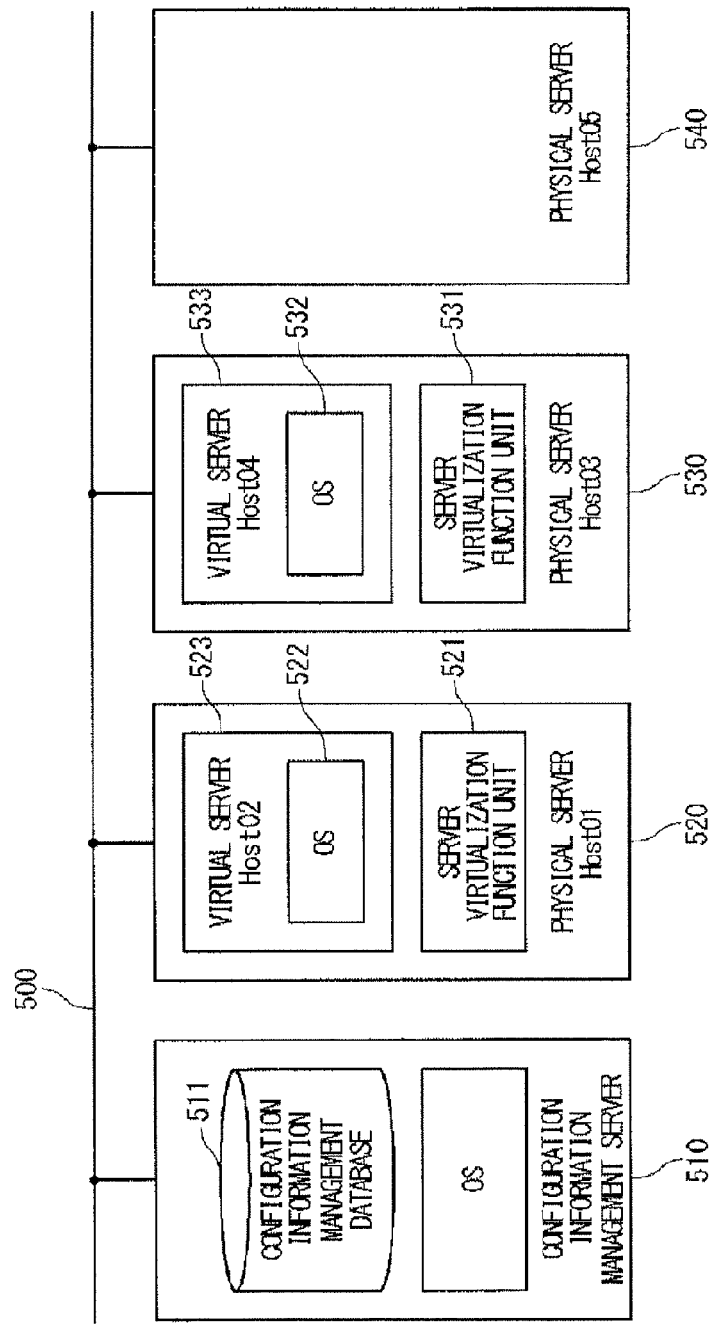
FIG. 8 is a block diagram showing a configuration of a first example of the present invention.

FIG. 8 shows a configuration example of the configuration information management system in a first example of the present invention.

In the configuration information management system in the present example, a configuration information management server 510 and three physical servers 520, 530 and 540 are connected with each other through a network 500. A server virtualization function unit 521 is installed in the physical server 520. A server virtualization function unit 531 is installed in the physical server 530. A virtual server 523 runs on the server virtualization function unit 521. A virtual server 533 runs on the server virtualization function unit 531.

The configuration information management server 510 corresponds to the configuration information management server 1 shown in FIG. 1. Each of the three physical servers 520, 530 and 540 corresponds to the physical server 2 shown in FIG. 1. Each of the virtual servers 523 and 533 corresponds to the virtual server 3 shown in FIG. 1. That is, the configuration of each server shown in FIG. 8 is based on the configuration example of each server shown in FIG. 1.

When the configuration information management server 510 collects the configuration information from all the virtual servers and physical servers being management targets through the network, information that one virtual server 522 is running on the server virtualization function unit 521 can be obtained. However, it is usually impossible to identify whether the virtual server 522 is Host02, Host04 or Host05.

According to the present invention, the server load generating function unit 107 and the configuration information correlating function unit 104 are provided in the configuration information management server 510, and the problem is solved by observing the load pattern 105 prepared beforehand.

[List of Configuration Information]

Figure 9:
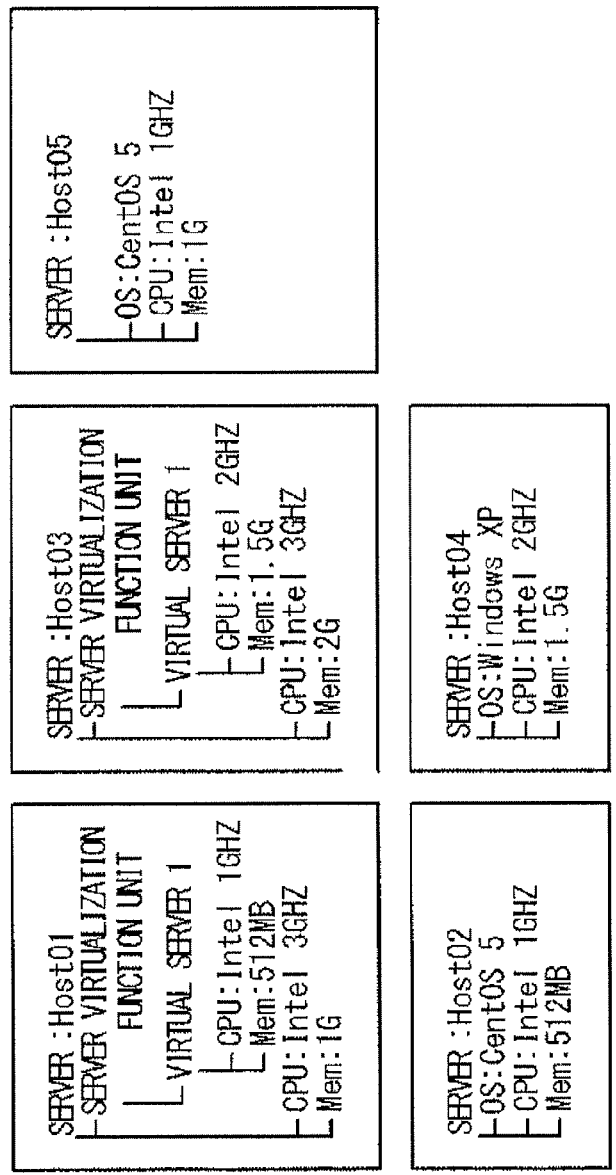
FIG. 9 is a diagram showing configuration information stored in a configuration information management database according to the first example.

FIG. 9 shows a list of the configuration information collected from all the virtual servers and physical servers.

Here, the configuration information management server 510 determines whether Host02 is a virtual server or not. If it is a virtual server, the configuration information management server 510 determines on which physical server the virtual server is running.

Figure 5:
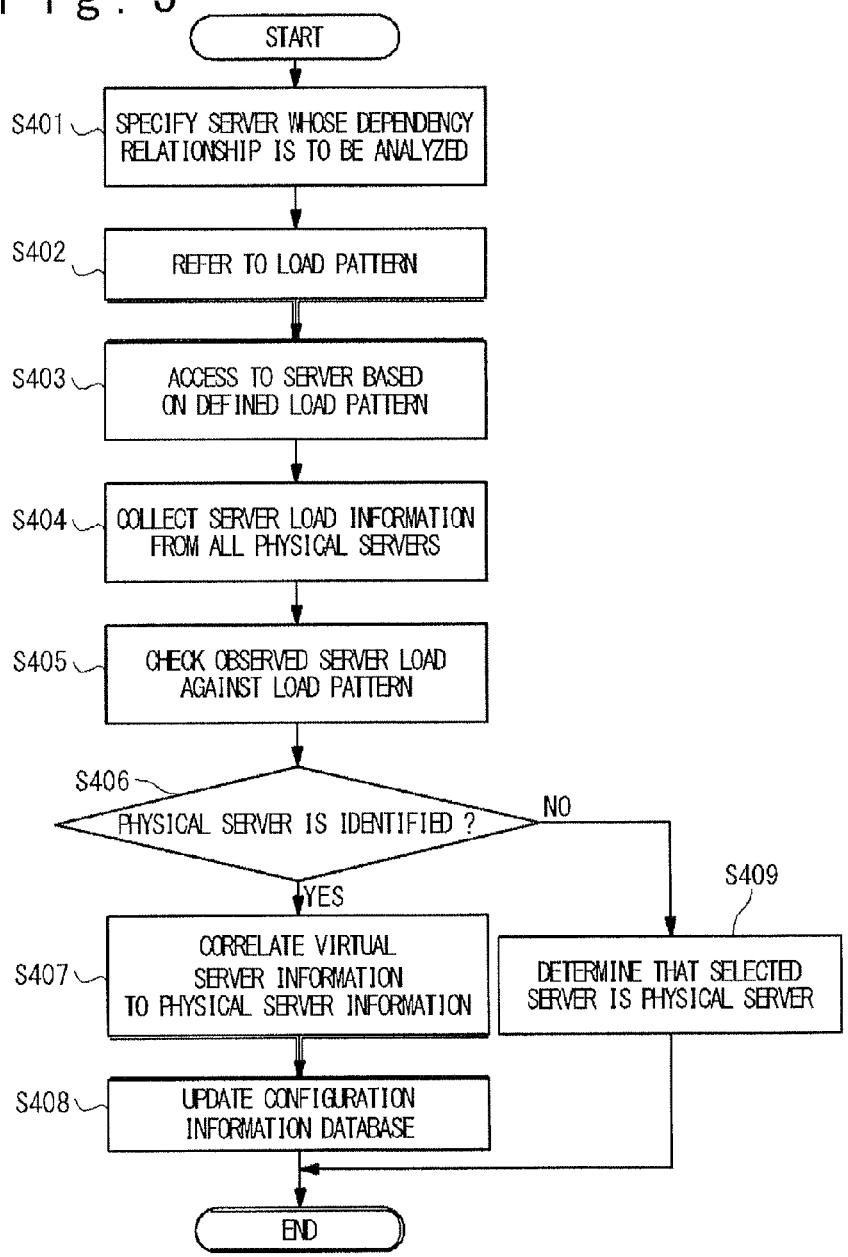
FIG. 5 is a flow chart showing an operation of obtaining, based on load information observed by imposing load on servers, a correspondence relationship between a physical server and a virtual server according to the first exemplary embodiment.

First, the server load generating function unit 107 in the configuration information management server 510 follows the flow chart shown in FIG. 5 to generate the test load corresponding to the characteristic load pattern for Host02. That is, the server load generating function unit 107 transmits to Host02 a signal that imposes the test load corresponding to the characteristic load pattern.

It should be noted that the characteristic load pattern is a load pattern whose characteristics are distinct, and imposing the characteristic load pattern on a virtual server has an obvious effect on a physical server on which the virtual server is running. Since all communication to the virtual server is performed through a network interface of the physical server, communication load with respect to the virtual server is also detected as communication load with respect to the physical server. The same applies to load other than the communication load.

[Example of Load Pattern (Ping Transmission)]

Figure 10:
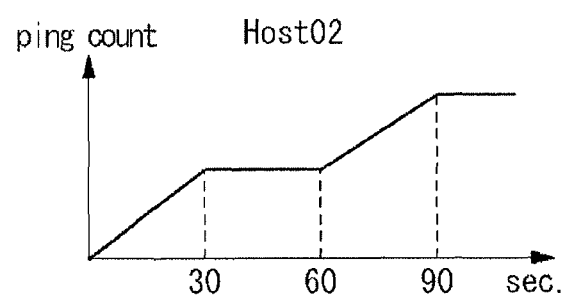
FIG. 10 is a diagram showing an example of a load pattern (ping send) transmitted to Host02 according to the first example.

FIG. 10 shows an example of the load pattern (ping send) transmitted to Host02.

Based on the load pattern shown in FIG. 10, the server load generating function unit 107 continuously executes a ping command with respect to Host02 for 30 seconds after test start (0 to 30 seconds) and suspends it 30 seconds after the test start time. The server load generating function unit 107 resumes 60 seconds after the test start time and then continuously executes a ping command again with respect to Host02 for 30 seconds (60 to 90 seconds) and terminates 90 seconds after the test start time. The ping command is a command for confirming network communication. Execution of the ping command causes communication between the configuration information management server 510 and Host02.

Here, since Host02 as a virtual server is running on Host01, the network communication between the configuration information management server 510 and Host02 is performed through a network interface on Host01. Therefore, the load pattern due to the communication is observed also on Host01.

[Example of Load Pattern (NW Load)]

Figure 11:
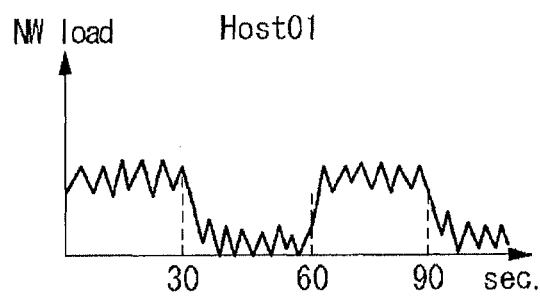
FIG. 11 is a diagram showing an example of a load pattern (NW load) observed by Host01 according to the first example.

FIG. 11 shows an example of the load pattern (NW load) expected to be observed in Host01.

When the ping command is executed with respect to the virtual server based on the load pattern shown in FIG. 10, the server information collecting function unit 103 can observe the load pattern as shown in FIG. 11 in both of the virtual server and the physical server on which the virtual server is running. As shown as the load pattern in FIG. 11, in the virtual server and the physical server on which the virtual server is running, the network load (NW load) is continuously imposed for 30 seconds after the test start time (0 to 30 seconds), the load is reduced 30 seconds after the test start time, and the load is imposed again on the network for 30 seconds from 60 seconds after the test start time (60 to 90 seconds). In this manner, it can be seen that the load pattern shown in FIG. 10 and the load pattern shown in FIG. 11 correspond to each other. The server information collecting function unit 103 stores the observed load statuses of the physical servers and the virtual servers as the server load information 106.

The configuration information correlating function unit 104 beforehand prepares the load pattern shown in FIG. 11 as a load pattern expected to be observed, and monitors load statuses of all the physical servers and virtual servers being the management targets. After the load pattern shown in FIG. 10 is transmitted to a certain virtual server, the configuration information correlating function unit 104 compares the load variations of all the physical servers and virtual servers and thereby can find a server matching the load pattern shown in FIG. 11. At this time, the configuration information correlating function unit 104 finds the virtual server receiving the load pattern shown in FIG. 10 and a physical server on which the virtual server is running as the server matching the load pattern shown in FIG. 11, and can correlate the virtual server to the physical server.

How to determine whether or not matching the load pattern shown in FIG. 11 will be described below.

For example, the configuration information correlating function unit 104 calculates average values of the network load (NW load) in respective periods from 0 to 30 seconds, from 30 seconds to 60 seconds and from 60 seconds to 90 seconds after the test start. Then, the configuration information correlating function unit 104 determines whether or not the average value of the network load (NW load) in the period from 30 seconds to 60 seconds is significantly smaller than the other average values, and thereby can determine whether or not matching the load pattern shown in FIG. 11. In practice, however, it is not limited to this example.

Regarding the servers other than Host02 in the present example, no communication due to the test occurs, the network load (NW load) does not vary so much and thus the load pattern shown in FIG. 11 is not detected. Since Host02 is an only server which matches the load pattern shown in FIG. 11, the configuration information correlating function unit 104 can identify the Host02 as a virtual machine running on Host01. Similarly, the configuration information correlating function unit 104 can identify that Host04 is running on Host03.

Whereas, regarding Host05, the server information collecting function unit 103 cannot detect the load information matching the load pattern from the servers other than Host05. Therefore, the configuration information correlating function unit 104 can identify that Host05 is a physical server.

Figure 12:
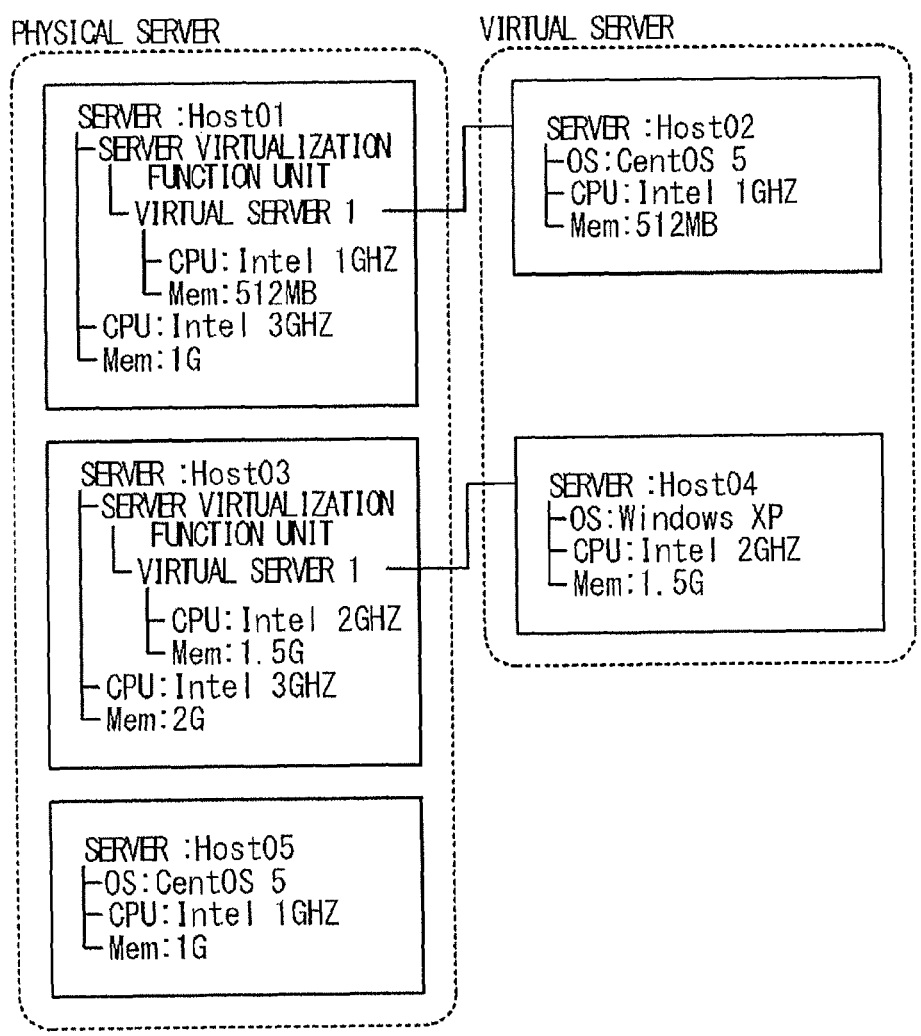
FIG. 12 is a diagram showing a relationship between configuration information after a dependency relationship between a physical server and a virtual server is identified according to the first example.

Based on the above-described test result, the configuration information correlating function unit 104 of the configuration information management server 510 generates information indicating a correspondence relationship between the physical servers and the virtual servers as shown in FIG. 12 and updates the configuration information management database.

Second Example

In the second example, let us describe a case where not the network load (NW load) but the CPU load or the disk load is imposed on the above-mentioned Host02.

For example, heavy load is temporarily imposed on the CPU of Host02 once every thirty seconds for a total of three times, instead of the load pattern shown in FIG. 10. In other words, the CPU load is imposed on Host02 at 30 seconds, 60 seconds and 90 seconds after the test start. At these times, CPU utilization increases temporarily.

[Example of Load Pattern (CPU Load)]

Figure 13:
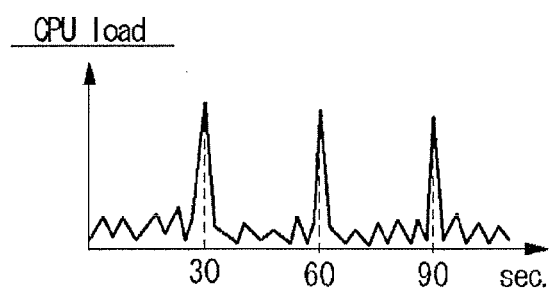
FIG. 13 is a diagram showing an example of a load pattern (CPU load) observed by Host01 according to a second example.

FIG. 13 shows an example of the load pattern (CPU load) that is expected to be observed in Host01 when the above-mentioned CPU load is imposed.

Alternatively, a large-size file is written to a disk I/O (Input/Output) of Host02 once every thirty seconds for a total of three times, instead of the load pattern shown in FIG. 10. In other words, the disk load is imposed on Host02 at 30 seconds, 60 seconds and 90 seconds after the test start. In this case, writing to the disk itself is the disk load.

[Example of Load Pattern (Disk Load)]

Figure 14:
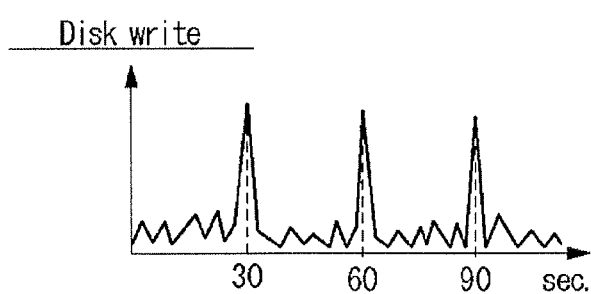
FIG. 14 is a diagram showing an example of a load pattern (disk load) observed by Host01 according to the second example.

FIG. 14 shows an example of the load pattern (disk load) that is expected to be observed in Host01 when the above-mentioned disk load is imposed.

The other processing is the same as in the case of the above-described first example.

Third Example

In a third example, the test load is imposed on all the virtual servers on the network system one-by-one by serial processing to check the correspondence relationship with the physical server.

The present example is useful in cases where the correspondence relationship between all the virtual servers and physical servers on the network system is desired to be checked and where existence of a virtual server running on the network system and a physical server on which the virtual server is running are desired to be checked.

For example, instead of selecting a target virtual server, the server load generating function unit 107 (or the server load test calling function unit 109) generates the test load corresponding to the characteristic load pattern with respect to all the virtual servers on the network system one-by-one in an ascending or descending order in a round-robin manner based on an identification number such as UUID (Universally Unique Identifier) allocated to each virtual server and address information such as a virtual MAC address.

Every time the test load is generated with respect to each virtual server, the server information collecting function unit 103 receives and observes the load information of all the physical servers. If characteristics corresponding to the characteristic load pattern appear in the load information of a physical server (i.e. if the load information of a physical server corresponds to the characteristic load pattern), the server information collecting function unit 103 determines that the virtual server is running on the physical server and correlates the virtual server to the physical server.

It should be noted that, since the target of the server load generation is the virtual server 3, the server load generating function unit 107 (or the server load test calling function unit 109) may transmit a command or a signal for generating the server load to the virtual servers 3 through the server virtualization function unit 202 on all the physical servers 2 being the management target.

INDUSTRIAL APPLICABILITY

The exemplary embodiments of the present invention can be applied to a configuration information management system of a system including a virtual server. It can be applied also to integrated operation management middleware of a system including a virtual server.

SUPPLEMENTARY NOTES

While a part of or whole of the above-described exemplary embodiments may be described as the following Supplementary notes, it is not limited to that in practice.

In the present exemplary embodiment, a configuration information management system may have: a means for collecting configuration information and load information from a plurality of physical servers and a virtual server; a means for generating, with respect to the virtual server, characteristic test load that can be observed in a physical server; a means for identifying, based on the observed server load information, a physical server on which the virtual server is running; and a means for storing a correspondence relationship between the virtual server and the physical server.

Also, in the present exemplary embodiment, a configuration information management system may have: a means for collecting configuration information and load information from a plurality of physical servers and a virtual server; a configuration information storage means for storing the collected configuration information; a server load information storage means for storing the collected load information; a mean for referring to system configuration information stored in configuration information database; a means for generating, with respect to the virtual server, characteristic test load that can be observed in a physical server; a means for checking the observed server load information against the generated load pattern to identify a physical server on which the virtual server is running; and a means for storing a correspondence relationship between the virtual server and the physical server.

Also, in the present exemplary embodiment, a configuration information management system may have: a means for collecting configuration information and load information from a plurality of physical servers and a virtual server; a configuration information storage means for storing the collected configuration information; a server load information storage means for storing the collected load information; a mean for referring to system configuration information stored in configuration information database; a means running on the virtual server for generating characteristic test load that can be observed in a physical server; a means for calling, as needed, the load generating means running on the virtual server; a means for checking the observed load information of the server in which the test load is generated against the load information of another server to identify a physical server on which the virtual server is running; and a means for storing a correspondence relationship between the virtual server and the physical server.

In the present exemplary embodiment, a configuration information management server communicatively connected to a plurality of physical servers and a virtual server running on at least any one of the plurality of physical servers may have a configuration information correlating function unit. When load with a pattern corresponding to a predetermined pattern is not measured from any server other than a first server on which load with the predetermined pattern is imposed, the configuration information correlating function unit stores, in a storage device, information indicating that the first server is a physical server.

Also, in the present exemplary embodiment, the configuration information management server may further have: a configuration information search function unit configured to receive a search request regarding the virtual server; and a correspondence relationship output unit configured to output, in response to the search request, information indicating the correspondence relationship between the physical server and the virtual server.

In the present exemplary embodiment, a configuration information management method may include: collecting configuration information and load information from a plurality of physical servers and a virtual server; generating, with respect to the virtual server, characteristic test load that can be observed in a physical server; identifying, based on the observed server load information, a physical server on which the virtual server is running; and storing a correspondence relationship between the virtual server and the physical server.

Also, in the present exemplary embodiment, a configuration information management method may include: collecting configuration information and load information from a plurality of physical servers and a virtual server; storing the collected configuration information in a configuration information management database; storing the collected load information as server load information; providing a function of referring to system configuration information stored in configuration information database; generating, with respect to the virtual server, characteristic test load that can be observed in a physical server; checking the observed server load information against the generated load pattern to identify a physical server on which the virtual server is running; and storing a correspondence relationship between the virtual server and the physical server.

Also, in the present exemplary embodiment, a configuration information management method may include: collecting configuration information and load information from a plurality of physical servers and a virtual server; storing the collected configuration information in a configuration information management database; storing the collected load information as server load information; providing a function of referring to system configuration information stored in configuration information database; calling, as needed, a load generating function running on the virtual server; generating characteristic test load that can be observed in a physical server; checking the observed load information of the server in which the test load is generated against the load information of another server to identify a physical server on which the virtual server is running; and storing a correspondence relationship between the virtual server and the physical server.

In the present exemplary embodiment, a configuration information management program may cause a computer to execute the following processing: collecting configuration information and load information from a plurality of physical servers and a virtual server; generating, with respect to the virtual server, characteristic test load that can be observed in a physical server; identifying, based on the observed server load information, a physical server on which the virtual server is running; and storing a correspondence relationship between the virtual server and the physical server. It should be noted that, in the present exemplary embodiment, the configuration information management program may be stored in a storage device or a recording medium.

Also, in the present exemplary embodiment, a configuration information management program may cause a computer to execute the following processing: collecting configuration information and load information from a plurality of physical servers and a virtual server; storing the collected configuration information in a configuration information management database; storing the collected load information as server load information; referring to system configuration information stored in configuration information database; generating, with respect to the virtual server, characteristic test load that can be observed in a physical server; checking the observed server load information against the generated load pattern to identify a physical server on which the virtual server is running; and storing a correspondence relationship between the virtual server and the physical server.

Also, in the present exemplary embodiment, a configuration information management program may cause a computer to execute the following processing: collecting configuration information and load information from a plurality of physical servers and a virtual server; storing the collected configuration information in a configuration information management database; storing the collected load information as server load information; referring to system configuration information stored in configuration information database; calling, as needed, a load generating function running on the virtual server; generating characteristic test load that can be observed in a physical server; checking the observed load information of the server in which the test load is generated against the load information of another server to identify a physical server on which the virtual server is running; and storing a correspondence relationship between the virtual server and the physical server.

According to the present invention, it is possible to monitor the load information of the virtual server and the load information of the physical server, to transmit a signal that imposes test load corresponding to a characteristic load pattern on the virtual server, and to identify a physical server on which the characteristic load is imposed as in the case of the virtual server. As a result, even after a system administrator loses sight of a virtual server, a physical server on which the virtual server is currently running can be recognized by the use of an external server such as a configuration information management server.

NOTE

While the invention has been particularly shown and described with reference to exemplary embodiments thereof, the invention is not limited to these exemplary embodiments. The invention may be modified and changed without departing from the scope and spirit of the invention.

It should be noted that this application is based upon and claims the benefit of priority from Japanese patent application No. 2010-046901, the disclosure of which is incorporated herein in its entirety by reference.

The invention claimed is:

1. A configuration information management server comprising:
   at least one processor; and
   a memory coupled to the at least one processor, the memory having stored thereon software units comprising:
      a server information collecting function software unit configured to measure load of each of a plurality of servers; and
      a configuration information correlating function software unit,
   wherein said plurality of servers comprises:
      a first server; and
      a second server other than said first server,
   wherein when load with a predetermined pattern is imposed on said first server and load with a pattern corresponding to said predetermined pattern is measured from said second server, said configuration information correlating function software unit stores, in a storage device, information indicating that said second server is a physical server and said first server is a virtual server running on said second server and information indicating a correspondence relationship between said physical server and said virtual server.

2. The configuration information management server according to claim 1, wherein the software units further comprise: a server load generating function software unit configured to impose load with said predetermined pattern on any one of said plurality of servers, wherein when the load with said predetermined pattern is imposed on said first server and load with a pattern corresponding to said predetermined pattern is not measured from any server other than said first server, said configuration information correlating function software unit stores, in the storage device, information indicating that said first server is a physical server.

3. The configuration information management server according to claim 1, wherein the software units further comprise:
a configuration information search function software unit configured to receive a search request regarding said virtual server; and
a correspondence relationship output software unit configured to output, in response to said search request, information indicating the correspondence relationship between said physical server and said virtual server.

4. The configuration information management server according to claim 3,
wherein said server information collecting function software unit collects configuration information of each of said plurality of servers and stores the configuration information of said each server in the storage device, and
said correspondence relationship output software unit outputs the configuration information of said physical server and the configuration information of said virtual server together with the information indicating the correspondence relationship between said physical server and said virtual server.

5. The configuration information management server according to claim 1,
wherein when the load with said predetermined pattern is imposed on said plurality of servers one-by-one and load with a pattern corresponding to said predetermined pattern is measured not only from a target server on which the load with said predetermined pattern is imposed but also from a non-target server, said configuration information correlating function software unit stores, in the storage device, information indicating that said non-target server is a physical server and said target server is a virtual server running on said load occurrence server.

6. The configuration information management server according to claim 1, wherein the software units further comprise: a server load generating function calling software unit,
wherein if a server load generating function software unit for generating load with said predetermined pattern within a virtual server is installed in the virtual server, said server load generating function calling software unit transmits an activation instruction for activating said server load generating function software unit to said plurality of servers one-by-one,
wherein said server load generating function software unit generates, in response to said activation instruction, load with said predetermined pattern within the virtual server, and
wherein when load with a pattern corresponding to said predetermined pattern is not measured from any server, said configuration information correlating function software unit stores, in the storage device, information indicating that a server being a destination of said activation instruction is a physical server.

7. The configuration information management server according to claim 6,
wherein said plurality of servers comprises:
a plurality of physical servers; and
one virtual server running on said plurality of physical servers,
wherein said server load generating function software unit imposes the load with said predetermined pattern on the one virtual server running on said plurality of physical servers.

8. A configuration information management method executed by a configuration information management server, comprising:
measuring load of each of a plurality of servers,
wherein said plurality of servers comprises:
a first server; and
a second server other than said first server; and
storing in a storage device, when load with a predetermined pattern is imposed on said first server and load with a pattern corresponding to said predetermined pattern is measured from said second server, information indicating that said second server is a physical server and said first server is a virtual server running on said second server and information indicating a correspondence relationship between said physical server and said virtual server.

9. The configuration information management method according to claim 8, further comprising:
imposing load with said predetermined pattern on any one of said plurality of servers; and
storing in the storage device, when the load with said predetermined pattern is imposed on said first server and load with a pattern corresponding to said predetermined pattern is not measured from any server other than said first server, information indicating that said first server is a physical server.

10. The configuration information management method according to claim 8, further comprising:
receiving a search request regarding said virtual server; and
outputting, in response to said search request, information indicating the correspondence relationship between said physical server and said virtual server.

11. The configuration information management method according to claim 10, further comprising:
collecting configuration information of each of said plurality of servers and storing the configuration information of said each server in the storage device, and
outputting the configuration information of said physical server and the configuration information of said virtual server together with the information indicating the correspondence relationship between said physical server and said virtual server.

12. The configuration information management method according to claim 8, further comprising:
imposing the load with said predetermined pattern on said plurality of servers one-by-one; and
storing in the storage device, when load with a pattern corresponding to said predetermined pattern is measured not only from a target server on which the load with said predetermined pattern is imposed but also from a non-target server, information indicating that said non-target server is a physical server and said target server is a virtual server running on said load occurrence server.

13. The configuration information management method according to claim 8, further comprising:
transmitting, if a server load generating function for generating load with said predetermined pattern within a virtual server is installed in the virtual server, an activation instruction for activating said server load generating function to said plurality of servers one-by-one;

generating, by said server load generating function, load with said predetermined pattern within the virtual server in response to said activation instruction; and storing in the storage device, when load with a pattern corresponding to said predetermined pattern is not measured from any server, information indicating that a server being a destination of said activation instruction is a physical server.

14. The configuration information management method according to claim 8, further comprising:

imposing the load with said predetermined pattern on one virtual server running on a plurality of physical servers among said plurality of servers.

15. A non-transitory computer readable medium storing a configuration information management that, when executed by at least one processor, causes a computer to perform the configuration information management method according to claim 8.

* * * * *